United States Patent
Bousseau et al.

(10) Patent No.: US 7,462,665 B2
(45) Date of Patent: Dec. 9, 2008

(54) AQUEOUS PAINT COMPOSITION, PARTICULARLY A LACQUER OR A VARNISH AND AN AQUEOUS COLLOIDAL DISPERSION OF CERIUM

(75) Inventors: Jean-Noël Bousseau, Paris (FR); David Fauchadour, Paris (FR); Bruno Tolla, Paris (FR)

(73) Assignee: Rhodia Electronics & Catalysis, La Rochelle (FR)

( * ) Notice: Subject to any disclaimer, the term of this patent is extended or adjusted under 35 U.S.C. 154(b) by 618 days.

(21) Appl. No.: 10/515,862

(22) PCT Filed: May 27, 2003

(86) PCT No.: PCT/FR03/01595

§ 371 (c)(1), (2), (4) Date: May 16, 2005

(87) PCT Pub. No.: WO03/099942

PCT Pub. Date: Dec. 4, 2003

(65) Prior Publication Data

US 2006/0167154 A1    Jul. 27, 2006

(30) Foreign Application Priority Data

May 28, 2002    (FR) .................... 02 06498

(51) Int. Cl.
*C08K 3/10*    (2006.01)
(52) U.S. Cl. .................................... 524/403
(58) Field of Classification Search ................ 524/406
See application file for complete search history.

(56) References Cited

U.S. PATENT DOCUMENTS

| | | | |
|---|---|---|---|
| 5,035,834 A | 7/1991 | Chane-Ching et al. | |
| 5,175,202 A | 12/1992 | Kissel | |
| 5,308,548 A | 5/1994 | Chane-Ching | |
| 5,344,588 A | 9/1994 | Chane-Ching | |
| 5,376,305 A | 12/1994 | Chane-Ching et al. | |
| 5,389,298 A | 2/1995 | Grosbois | |
| 5,733,361 A | 3/1998 | Chane-Ching et al. | |
| 5,922,330 A | 7/1999 | Chane-Ching et al. | |
| 6,187,438 B1 | 2/2001 | Chopin | |
| 6,649,156 B1 * | 11/2003 | Chane-Ching | 424/70.9 |
| 2003/0068345 A1 * | 4/2003 | Nishihama | 424/401 |
| 2003/0068486 A1 * | 4/2003 | Arney et al. | 428/323 |
| 2003/0109589 A1 | 6/2003 | Chane-Ching | |

FOREIGN PATENT DOCUMENTS

| | | |
|---|---|---|
| EP | 0 208 580 B1 | 1/1990 |
| EP | 0 208 581 B1 | 3/1990 |
| EP | 0 316 205 B1 | 5/1992 |
| EP | 0 239 477 B1 | 8/1992 |
| EP | 0 206 906 B1 | 8/1994 |
| EP | 0 732 356 A2 | 9/1996 |
| EP | 0 700 870 B1 | 7/1999 |
| EP | 0 700 871 B1 | 1/2000 |
| JP | 8-53637 | 2/1996 |
| WO | WO 98/01392 A1 | 1/1998 |
| WO | WO 01/38225 | 3/2001 |
| WO | WO 01/49405 A1 | 7/2001 |

* cited by examiner

*Primary Examiner*—Nathan M Nutter
(74) *Attorney, Agent, or Firm*—Buchanan, Ingersoll & Rooney, PC

(57) ABSTRACT

The invention relates to an aqueous paint composition, particularly a lacquer or a varnish and an aqueous colloidal dispersion of cerium. Said dispersion has a pH of at least 7 and comprises an organic acid with at least three acid functions of which the third pK is at most 10 or a salt of said acid with ammonia or an amine. Said composition has an improved water content and mechanical properties which improve throughout the life thereof or the duration of the presence thereof on the substrate for protection.

12 Claims, No Drawings

AQUEOUS PAINT COMPOSITION, PARTICULARLY A LACQUER OR A VARNISH AND AN AQUEOUS COLLOIDAL DISPERSION OF CERIUM

This is an application under 35 U.S.C. Section 371 of International Application Number PCT/FR03/01595 filed on May 27, 2003.

The present invention relates to a composition based on an aqueous paint, in particular on a stain or on a varnish, and on a colloidal aqueous cerium dispersion.

Many substances are currently used in the furniture industry, joinery, the laying of floor boards and the building industry for protecting wood from damage due to light and bad weather in particular. It is known that UV radiation, combined with water and oxygen, has the effect of rapidly taking the color out of wood. Furthermore, when wood is used very particularly externally, it is also necessary to protect it from the growth of algae, fungi and various microorganisms.

Paints, and in particular stains and varnishes, are currently employed for such wood protection.

However, the known stains and varnishes, which are complex formulations based on organic products, such as isocyanate complexes, for example, on inorganic products, such as iron oxides, or on protective additives, such as UV absorbers (benzotriazole, for example), exhibit a durability or a protective effect with regard to UV radiation which is not entirely satisfactory. This is because organic UV absorbers can decompose over time, they can migrate at the surface or they can be leached out by bad weather. The known inorganic UV absorbers, such as titanium dioxides, have to be used in sufficiently high concentrations to be effective with regard to UV radiation but the increase in the concentrations occurs at the expense of the transparency, of the resistance to water or of the mechanical strength of the varnish or stain. Furthermore, UV-crosslinkable formulations are experiencing increasingly significant growth. In point of fact, organic UV absorbers can block the crosslinking of the formulations when they are applied to wood.

Finally, for ecological reasons and reasons of simplicity of use, there is an increasingly pressing demand for aqueous formulations, to which the solutions developed for organic formulations cannot be adapted.

There is therefore a need for aqueous paints and stains or varnishes possessing higher durability. This need exists not only in the wood industry, as indicated above, but also in other fields, such as cosmetics, the protection of inks, of fibers or of fabrics, of photo-sensitive pigments or more generally of any volume situated behind a surface requiring protection from the harmful effects of UV radiation, of water and of oxygen or of one of these elements.

The object of the invention is thus to improve this durability.

With this aim, the composition of the invention is characterized in that it comprises the mixture of an aqueous paint and of an aqueous colloidal dispersion of a cerium compound, this dispersion exhibiting a pH of at least 7 and comprising an organic acid having at least three acid functional groups, the third pK of which is at most 10, or a salt of this acid, and aqueous ammonia or an amine.

The compositions of the invention which incorporate such a colloidal dispersion exhibit a resistance to water and a mechanical strength which are improved, which thus increases their lifetime or the duration of their presence on the substrate which they protect. Their resistance to aging may also be increased.

Furthermore, in the case of the compositions based on emulsion alkyd resins, the colloidal dispersion according to the invention has a drying effect, that is to say that it acts as crosslinking catalyst.

In addition, the presence of a colloidal dispersion according to the invention makes it possible to retain the advantages described above, even in UV-crosslinkable compositions.

Other characteristics, details and advantages of the invention will become even more fully apparent on reading the description which will follow and the various concrete but nonlimiting examples intended to illustrate it.

In the present description, the term "paint" is employed within the broad sense to denote any coating of polymeric nature deposited on a substrate which can have in particular a function of protecting the latter and more particularly to denote aqueous paints proper, to denote varnishes and to denote stains. The terms "stain" and "varnish" have the usual meanings in the technical field concerned here. It will be specified, for the stain, that it is generally a transparent or semitransparent formulation or composition applied to wood or to the substrate which is intended to protect it and which has a solids content which can be of the order of 10% by weight or of the order of 40% to 50% by weight, depending on whether it is a base stain or a finishing stain. The varnish is a formulation or a composition which is more concentrated than the stain.

Mention may thus be made, as paints to which the present invention relates, of paints based on the following emulsion resins: alkyd resins, the commonest of which is known as phthalic glycerol alkyd resin; modified resins comprising long or short oil; acrylic resins derived from esters of acrylic acid (methyl or ethyl) and methacrylic acid, optionally copolymerized with ethyl, 2-ethylhexyl or butyl acrylate, and acrylic/isocyanate resins; vinyl resins, such as, for example, poly(vinyl acetate), poly(vinyl chloride), polyvinylbutyral, polyvinylformal, and copolymers of vinyl chloride and vinyl acetate or vinylidene chloride; aminoplast or phenolic resins, generally modified; polyester resins; polyurethane resins; epoxy resins; silicone resins; or cellulose or nitrocellulose resins.

The invention applies generally to any type of aqueous paint, in particular to any type of stain or varnish, used on any substrate. This substrate can in particular be wood or metals; in the latter case, for example, the invention can be applied to automobile paints. The substrate can also be a glass, of the type of glass used in construction or glass intended to comprise photosensitive products or materials. Other possible substrates are protective coatings for organic or inorganic packaging, in particular when it is desired to retain transparency in the visible light region. Mention may also be made, as other substrates, of fibers or fabrics. Thus, the invention can be used in the protection of fibers or fabrics by coating these with compositions comprising an organic binder or an emulsion resin of the type described above and an aqueous cerium dispersion.

The invention also applies to varnishes used in cosmetics. Furthermore, the invention advantageously applies to UV-crosslinkable compositions, in particular to UV-crosslinkable stains, that is to say stains which immediately after their deposition on the substrate, in particular on wood, are subjected to treatment with ultraviolet radiation in order to dry them.

Finally, it will be noted that the paint, stain and varnish compositions obtained by the implementation of the invention respond to the ecological restrictions due to the nonecotoxic nature of cerium oxide.

The expressions "aqueous colloidal dispersion of a cerium compound" or "aqueous cerium dispersion" or "cerium sol" denote any system composed of fine solid particles of a cerium compound, of colloidal dimensions, in suspension in an aqueous liquid phase. These particles can, in addition, optionally comprise residual amounts of bonded or adsorbed ions, such as, for example, nitrate, acetate or ammonium ions. The term "colloidal dimensions" is understood to mean dimensions of between approximately 1 nm and approximately 500 nm. It will be noted that, in such a dispersion, the cerium can be either entirely in the form of colloids or simultaneously in the form of ions and in the form of colloids.

The cerium is present in the dispersion generally in the form of cerium oxide and/or of hydrated cerium oxide (hydroxide).

The particles of the cerium dispersion preferably have a size of at most 200 nm, more particularly of at most 100 nm. This size can more particularly still be at most 10 nm. The sizes given here are determined by photometric counting from an HRTEM (High Resolution Transmission Electron Microscopy) analysis supplemented, if necessary, by cryomicroscopy.

The colloidal dispersions used in the context of the invention exhibit specific characteristics. They comprise, first, a specific acid and, secondly, a base which is aqueous ammonia or an amine. Finally, they exhibit a specific pH.

As indicated above, the acid is an organic acid, that is to say that it comprises at least one chain of carbon atoms, it being understood that it can, however, comprise heteroatoms. In addition, this acid must comprise at least three acid functional groups and its third pK is at most 10. More particularly, this third pK can be at most 7.

The dispersion of the invention can comprise either an acid as defined above or a salt of this acid. This salt can more particularly be an alkaline salt.

In the dispersion of the invention, the acid interacts with the cerium cation via any type of chemical bond. For this reason, the acid is therefore present on or within the particles of cerium compounds but it can also be present in the aqueous phase.

Mention may very particularly be made, as suitable acid, of citric acid.

The level of acid in the dispersion, expressed by the moles of acid/moles of cerium ratio, can be, for example, between 0.01 approximately and 1.5 approximately, more particularly between 0.2 and 0.5. It should be noted here that this level depends on the size of the particles of the dispersion, this level decreasing as the size of the particles increases. It will be noted here that the lower limit of this level is that below which the dispersion is no longer stable. The upper limit depends in fact on the solubility of the acid used and also on the maximum amount of acid beyond which there is a risk of seeing the dispersion converted to a gel.

As indicated above, the dispersion also comprises a base which can be aqueous ammonia but also an amine. Any type of amine, primary, secondary or tertiary, may be suitable. It will be noted that it is possible to use aminoalcohols, such as, for example, 2-amino-2-methyl-1-propanol.

The dispersions used in the context of the invention exhibit a pH of at least 7 and which is preferably between 7.5 and 9.5, more particularly between 7.5 and 9. A pH of 7.5 at least makes it possible to have greater effectiveness of the ingredients conventionally used in paints.

The dispersions which are suitable for the implementation of the invention may be those disclosed in patent application WO 01/38225.

Dispersions usable in the context of the invention can also be prepared starting from colloidal cerium dispersions to which an acid (for example citric acid) and a base (aqueous ammonia or amine), such as are defined above, are added, so as to obtain the necessary pH value. The acid can be added to the starting dispersion in a first step and then the base in a second step. However, it is possible to add the acid and the base simultaneously. The starting colloidal dispersion may have been obtained, for example, by the processes disclosed in European patent applications EP 206 906, EP 208 581, EP 316 205, EP 700 870 and EP 700 871. Use may very particularly be made of the colloidal dispersions obtained by thermal hydrolysis of an aqueous solution of a cerium(IV) salt, such as a nitrate, in particular in acidic medium. Such a process is disclosed in European patent applications EP 239 477 or EP 208 580. In the latter application, for example, first of all a colloidal dispersion of a cerium(IV) compound is prepared by reacting an aqueous solution of cerium(IV) salt with a base and then this dispersion is treated thermally, whereby a precipitate is obtained. This precipitate can be resuspended in water and can thus give a colloidal dispersion which can be used in the present invention after addition of the acid and of the base, as indicated above.

The composition according to the invention can be prepared by simple mixing of the colloidal dispersion with the paint, in particular the stain or the varnish. The amount of colloidal dispersion used depends on the final content of cerium oxide desired in the composition. This content can have any value. It may be noted that it is possible to operate with high contents of cerium without, however, harming the resistance to water or the mechanical strength of the paint, stain or varnish. Generally, a colloidal dispersion is used in an amount such that the cerium oxide content is at most 25% by weight, preferably at most 10% by weight and more preferably still at most 3% by weight, with respect to the whole composition. This amount is sufficient to make it possible to have, at the same time, a paint, a stain or a varnish which provides effective protection of the substrate, in particular of wood, from UV radiation and which exhibits an enhanced durability.

Examples will now be given.

In these examples, the tests and the cerium sol described below are employed.

Colorimetry

Measurement Conditions:

The calorimetric measurements are carried out according to standard ISO 7724 using a Minolta CM 3610D spectrocolorimeter.

The measurement conditions are as follows:

specular included (all the backscattered intensity is measured), the ultraviolet radiation is 100% filtered out, the results are expressed under the illuminant/observer pair C/10°.

The measurements were carried out on contrast cards, the paint being applied at 150 microns (paint in the wet state). In order to measure the transparency, the measurements are carried out on the black background of the contrast cards.

Resistance to Water

Measurement Conditions:

The resistance to water is evaluated by a measurement of contact angle between a drop of water and the paint or the stain using a Rame-Hart goniometer. The higher the drop angle, the greater the hydrophobicity of the paint or stain and thus the lower the sensitivity to water. The paints or stains are applied to a contrast card; the paints or stains are applied with a film drawer at a thickness of 150 microns.

Aging

The test is of the QUVA type. It is carried out under the following conditions:
Irradiation conditions: UV-A lamp with a peak centered at 340 nm,
Chamber temperature: 60° C.,
Operating cycle: 4 hours of irradiation in the dry phase at a temperature of 60° C. and then 4 hours of condensation in darkness at a temperature of 60° C.

The moisture is introduced by heating a water tank situated at the bottom of the device (water vapor is thus produced) and then this water condenses on the panels of paints.

Mechanical Strength

The mechanical strength of the stains is measured in two ways:

A hardness measurement is carried out on the stain film using the Persoz hardness test. This test is carried out according to standard NFT 30-016 (paints and varnishes—measurement of the hardness of a paint or varnish film using the Persoz pendulum). This test is carried out on varnish films applied at 150 μm or 300 μm (paint in the wet state) to glass sheets using an applicator of calibrated thickness. The characterization principle is to measure the damping time of a pendulum resting, via two steel balls, on the film to be studied. The hardness is expressed in seconds (time of one oscillation), which corresponds to the number of oscillations of the pendulum when the latter is inclined by 12° with respect to the normal at the start and 4°, which corresponds to the end of the test.

A measurement of scratch resistance is carried out using a Braive sclerometer. The sclerometer is a stylus equipped with a tungsten tip, a pressure which can be varied using a calibrated spring being applied to the stylus (the pressure is expressed in grams). The scratch resistance is the maximum pressure (in grams) at which the tungsten tip of the stylus leaves no mark. This test is carried out on varnish films applied at 150 μm (paint in the wet state) to glass sheets using an applicator of calibrated thickness.

Test of Resistance to Methyl Ethyl Ketone (MEK)

The crosslinking throughout the body of the varnish films is tested by resistance to methyl ethyl ketone (rub test); a hydrophilic cotton swab impregnated with solvent is applied to the paint and the number of to-and-fro movements carried out before the paint is destroyed is recorded.

Measurement Test on the Rate of Crosslinking of the Alkyd Binders by Oxygen Consumption The crosslinking reaction of the alkyd polymers is an oxidation reaction with atmospheric oxygen. In the present case, the tests are applied at 150 μm wet to aluminum sheets using an applicator of calibrated thickness. These sheets are subsequently introduced into a leaktight test tube. After 24 hours, the variation in the % $O_2$/% $N_2$ ratio by volume is measured by gas chromatography using a microGC M200 microchromatograph from MTI. The ratio decreases because of the oxygen consumption due to the crosslinking of the alkyd polymer. The drying rate is expressed as percentage of variation in this ratio % $O_2$/% $N_2$ with respect to the initial % $O_2$/% $N_2$ per hour and per $m^2$ of varnish.

Cerium Sol

In the examples which follow, the cerium sol used was prepared in the following way. A $CeO_2$ precipitate, prepared according to example 1 of patent application EP 208 580, is dispersed in demineralized water, in order to obtain a $CeO_2$ dispersion. The dispersion is left standing at ambient temperature overnight (16 hours).

This dispersion exhibits a concentration of 103.7 g·l$^{-1}$ and its pH is 1.35.

5.07 g of solid citric acid monohydrate, Prolabo Rectapur grade, are added to 100 ml of this colloidal dispersion thus prepared, i.e. a citric acid monohydrate/$CeO_2$ ratio by weight of 0.49. The molar mass of the citric acid monohydrate used is 210.14 g·mol$^{-1}$ and the citric acid/Ce molar ratio is fixed equal to 0.40.

The system is homogenized for approximately 60 minutes. An amount of aqueous ammonia, with a concentration equal to 10.8M, sufficient to obtain a pH of 8.7 is added to the latter system. The dispersion obtained exhibits a $CeO_2$ concentration of the order of 95 g·l$^{-1}$.

It is composed of monodisperse particles with a size of the order of 7-9 nm.

For all the examples, the organic UV absorber is Tinuvin 1130 from Ciba and the inorganic UV absorber (titanium oxide) is Hombitec RM 400 from Sachtleben.

EXAMPLE 1

This example relates to a stain of conventional formulation of the styrene/acrylic type, the formulation of which is described in table No. 1 below:

TABLE 1

| Products | Weight | Description |
|---|---|---|
| DS913 (Rhodia) | 56.34 | styrene/acrylic latex |
| Water | 11.97 | |
| Monopropylene glycol | 2.57 | plasticizer |
| Proxel GXL (Zeneca) | 0.10 | biocide |
| Tego 1488 (Goldschmidt) | 0.20 | antifoaming agent |
| Premix 1 | | |
| Rhodaline RH5210 (Rhodia) | 4.41 | thickening agent |
| Rhodoline DP 1210 (Rhodia) | 0.31 | dispersing agent |
| Tego 1488 | 0.20 | antifoaming agent |
| Dowanol DPnB (Degussa) | 4.11 | coalescence agent |
| Water | 4.23 | |
| Acematt OK 412 (Degussa) | 2.40 | silica |
| Premix 2 | | |
| Rhodoline RH5210 (Rhodia) | 1.46 | thickening agent |
| Troysol LAC (Troy) | 0.40 | anti-cratering agent |
| Woodol 100 (Provigen) | 2.04 | fungicidal agent |
| Water | 9.28 | |
| Total | 100 | solids content by weight: 28% pH = 7.2 |

The colloidal dispersion is incorporated by simple mixing at a content of 1.4% of active material (cerium oxide) with respect to the total of the formulation. An organic UV absorber is incorporated in the same way as above at a content of 1% with respect to the total to give a comparative formulation (2). An inorganic UV absorber is incorporated in the same way as above at a content of 1.4% as dry matter with respect to the total to give a comparative formulation (3).

The formulations thus prepared are applied to different substrates and are subjected to conditioning in the air in a controlled atmosphere (21° C.±2° C., 55%±5% relative humidity) for one week before their evaluation.

The results are given in table 2 below.

TABLE 2

| Formulation | Description |
| --- | --- |
| 1, comparative | Styrene/acrylic stain without UV absorber |
| 2, comparative | Stain with 1% organic UV absorber |
| 3, comparative | Stain with 1.4% inorganic UV absorber |
| 4, according to the invention | Stain with 1.4% cerium (cerium oxide) sol |

The results of the calorimetric measurements are given in table 3 below.

TABLE 3

| | Black background | | |
| --- | --- | --- | --- |
| Formulation | L* | a* | b* |
| 1, comparative | 28.2 | 0.19 | −0.09 |
| 2, comparative | 28.3 | 0.17 | −0.03 |
| 3, comparative | 34.9 | −0.06 | −7.07 |
| 4, according to the invention | 28.6 | 0.02 | −0.03 |

It is found, from table 3, that the color of the stains according to the invention comprising a sol undergoes virtually no variation.

The results of the measurements of resistance to water are given in the following table 4.

TABLE 4

| Formulation | Contact angle (°) |
| --- | --- |
| 1, comparative | 63 |
| 2, comparative | 59 |
| 3, comparative | 66 |
| 4, according to the invention | 70 |

An improvement in the resistance to water for the stain according to the invention comprising a sol, which thereby renders it hydrophobic, is recorded.

The resistance to water is also evaluated by a measurement of change in color (dE*) of the stain after contact with water. The tests are evaluated by colorimetry before and after the stain applied and a drop of water have been in contact for 15 minutes. The greater the color difference, the greater the hydrophilicity of the stain and thus the greater the sensitivity to water.

The stains are applied to contrast cards at a wet thickness of 150 μm; the calorimetric measurements are carried out on a black background.

The results are given in the following table 5.

TABLE 5

| Formulation | Difference in color after being in contact for 15 minutes |
| --- | --- |
| 1, comparative | 7.6 |
| 2, comparative | 9.4 |
| 3, comparative | 17.7 |
| 4, according to the invention | 3.9 |

An improvement in the resistance to water for the stain according to the invention comprising a cerium sol is recorded.

The mechanical strength results are summarized in table 6 below.

TABLE 6

| Formulation | Persoz hardness (seconds) |
| --- | --- |
| 1, comparative | 30 |
| 2, comparative | 30 |
| 3, comparative | 31 |
| 4, according to the invention | 50 |

The product 4 markedly improves the mechanical strength of the stain.

The aging results obtained from a test of the QUVA type are summarized in table 7 below. The stains were applied to boards of maritime pine using a brush, so as to have a weight per unit area of 325 g/m$^2$.

The difference in color (dE*) is recorded at two exposure times: 40 cycles and 340 cycles.

TABLE 7

| Formulation | dE* at 40 exposure cycles | dE* at 340 exposure cycles |
| --- | --- | --- |
| 1, comparative | 26 | 30 |
| 2, comparative | 12 | 24 |
| 3, comparative | 8 | 22 |
| 4, according to the invention | 10 | 18 |

The times are expressed in cycles of 8 hours.

The product 4 markedly improves the resistance to aging of the paint.

EXAMPLE 2

This example relates to a stain of conventional industrial formulation for external finishing of the dispersed acrylic/polyurethane type with the commercial reference AZ930 originating from Arch Coatings France.

The colloidal dispersion is incorporated by simple mixing at a content of 1.9% of active material (cerium oxide) with respect to the total of the formulation. An organic UV absorber is incorporated in the same way as above at a content of 1% with respect to the total to give the comparative formulation (6).

The formulations thus prepared are applied to different substrates and are subjected to conditioning in air for one week before their evaluation.

TABLE 8

| Formulation | Description |
| --- | --- |
| 5, comparative | AZ930 stain without UV absorber |
| 6, comparative | Stain with 1% organic UV absorber |
| 7, according to the invention | Stain with 1.9% cerium (cerium oxide) sol |

The results of the measurements of resistance to water are given in the following table 9.

TABLE 9

| Formulation | Contact angle (°) |
| --- | --- |
| 5, comparative | 69 |
| 6, comparative | 69 |
| 7, according to the invention | 81 |

An improvement in the resistance to water, indeed even a beading effect, for the stain according to the invention comprising a cerium sol, which renders the stain hydrophobic, is recorded.

The mechanical strength results are summarized in table 10 below.

TABLE 10

| Formulation | Persoz hardness (seconds) | Scratch resistance (grams) |
| --- | --- | --- |
| 5, comparative | 89 | 110 |
| 6, comparative | 75 | 180 |
| 7, according to the invention | 146 | 260 |

The product 7 markedly improves the mechanical strength of the stain.

EXAMPLE 3

This example relates to a conventional decorative gloss paint based on acrylic latex with a pigment volume concentration of 16% and a solids content by weight of 49%.

The colloidal dispersion is incorporated by simple mixing at a content of 1.5% of active material (cerium oxide) with respect to the total of the formulation. The formulations thus prepared are applied to different substrates and are subjected to conditioning in the air in a controlled atmosphere (21° C.±2° C., 55%±5% relative humidity) for one week before their evaluation.

TABLE 11

| Formulation | Description |
| --- | --- |
| 8, comparative | Gloss paint based on acrylic latex without UV absorber |
| 9, according to the invention | Paint with 1.5% cerium (cerium oxide) sol |

The results of the measurements of resistance to water are given in the following table 12.

TABLE 12

| Formulation | Contact angle (°) |
| --- | --- |
| 8, comparative | 17 |
| 9, according to the invention | 48 |

An improvement in the resistance to water for the paint according to the invention comprising a cerium sol, which thereby renders it less hydrophilic, is recorded.

The mechanical strength results are summarized in table 13 below.

TABLE 13

| Formulation | Persoz hardness (seconds) | Scratch resistance (grams) |
| --- | --- | --- |
| 8, comparative | 37 | 50 |
| 9, according to the invention | 41 | 75 |

The product 9 improves the mechanical strength of the paint.

EXAMPLE 4

This example relates to a conventional decorative satin paint based on acrylic latex with a pigment volume concentration of 28% and a solids content by weight of 53%.

The colloidal dispersion is incorporated by simple mixing at a content of 1.5% of active material (cerium oxide) with respect to the total of the formulation. The formulations thus prepared are applied to different substrates and are subjected to conditioning in the air in a controlled atmosphere (21° C.±2° C., 55%±5% relative humidity) for one week before their evaluation.

TABLE 14

| Formulation | Description |
| --- | --- |
| 10, comparative | Satin paint based on acrylic latex without UV absorber |
| 11, according to the invention | Paint with 1.5% cerium (cerium oxide) sol |

The results of the measurements of resistance to water are given in the following table 15.

TABLE 15

| Formulation | Contact angle (°) |
| --- | --- |
| 10, comparative | 59 |
| 11, according to the invention | 67 |

An improvement in the resistance to water for the paint according to the invention comprising a cerium sol, which thereby renders it less hydrophilic, is recorded.

The mechanical strength results are summarized in table 16 below.

TABLE 16

| Formulation | Persoz hardness (seconds) | Scratch resistance (grams) |
| --- | --- | --- |
| 10, comparative | 55 | 75 |
| 11, according to the invention | 60 | 125 |

The product 11 improves the mechanical strength of the paint.

EXAMPLE 5

This example relates to a conventional decorative matt breathing paint for external application based on styrene/acrylic latex with a pigment volume concentration of 48% and a solids content by weight of 61%.

The colloidal dispersion is incorporated by simple mixing at a content of 1.5% of active material (cerium oxide) with respect to the total of the formulation. The formulations thus prepared are applied to different substrates and are subjected to conditioning in the air in a controlled atmosphere (21° C.±2° C., 55%±5% relative humidity) for one week before their evaluation.

TABLE 17

| Formulation | Description |
| --- | --- |
| 12, comparative | Exterior matt breathing paint based on styrene/acrylic latex without UV absorber |
| 13, according to the invention | Paint with 1.5% cerium (cerium oxide) sol |

The results of the measurements of resistance to water are given in the following table 18.

TABLE 18

| Formulation | Contact angle (°) |
|---|---|
| 12, comparative | 79 |
| 13, according to the invention | 90 |

An improvement in the resistance to water, indeed even a beading effect, for the paint according to the invention comprising a cerium sol, which thereby renders it hydrophobic, is recorded.

The mechanical strength results are summarized in table 19 below.

TABLE 19

| Formulation | Persoz hardness (seconds) | Scratch resistance (grams) |
|---|---|---|
| 12, comparative | 30 | 200 |
| 13, according to the invention | 37 | 225 |

An improvement in the mechanical strength of the paint is recorded for the product 13.

EXAMPLE 6

This example relates to a conventional decorative matt breathing paint for interior application based on styrene/acrylic latex with a pigment volume concentration of 66% and a solids content by weight of 61%.

The colloidal dispersion is incorporated by simple mixing at a content of 1.5% of active material (cerium oxide) with respect to the total of the formulation. The formulations thus prepared are applied to different substrates and are subjected to conditioning in the air in a controlled atmosphere (21° C.±2° C., 55%±5% relative humidity) for one week before their evaluation.

TABLE 20

| Formulation | Description |
|---|---|
| 14, comparative | Interior matt breathing paint based on styrene/acrylic latex without UV absorber |
| 15, according to the invention | Paint with 1.5% cerium (cerium oxide) sol |

The results of the measurements of resistance to water are given in the following table 21.

TABLE 21

| Formulation | Contact angle (°) |
|---|---|
| 14, comparative | 93 |
| 15, according to the invention | 103 |

An improvement in the resistance to water, indeed even a beading effect, for the paint according to the invention comprising a cerium sol, which thereby renders it hydrophobic, is recorded.

The mechanical strength results are summarized in table 22 below.

TABLE 22

| Formulation | Persoz hardness (seconds) | Scratch resistance (grams) |
|---|---|---|
| 14, comparative | 59 | 120 |
| 15, according to the invention | 72 | 130 |

The product 15 improves the mechanical strength of the paint.

EXAMPLE 7

This example relates to an alkyd emulsion with the commercial name Uradil AZ554Z50 manufactured by DSM with a solids content by weight of 50%.

The colloidal dispersion is incorporated by simple mixing at a content of 0.35% of active material (cerium oxide) with respect to the total of the emulsion. The formulations thus prepared are applied to glass sheets at a wet thickness of 300 μm using an applicator of calibrated thickness and are subjected to conditioning in the air in a controlled atmosphere (21° C.±2° C.; 55%±5% relative humidity).

TABLE 23

| Formulation | Description |
|---|---|
| 16, comparative | Uradil AZ554Z50 emulsion without cerium sol |
| 17, according to the invention | Emulsion with 0.35% cerium (cerium oxide) sol |

The results of the Persoz hardness measurements, carried out after drying for 24 hours and 41 hours, are given in the following table 24.

TABLE 24

| Formulation | Hardness at 24 hours | Hardness at 41 hours |
|---|---|---|
| 16, comparative | 11 | 18 |
| 17, according to the invention | 15 | 22 |

An improvement in the Persoz hardness is recorded, which implies that the cerium sol enhances the state of crosslinking of the alkyd polymer film.

The results of resistance to methyl ethyl ketone after drying for 41 hours are summarized in table 25 below.

TABLE 25

| Formulation | Resistance to MEK (rub test) |
|---|---|
| 16, comparative | 2 |
| 17, according to the invention | 6 |

The product 17 improves the resistance to methyl ethyl ketone, which implies that the state of crosslinking at the heart of the alkyd polymer is improved by the cerium sol.

The measurements of crosslinking reaction rates of the alkyd emulsion by measurements of oxygen consumption are summarized in table 26 below.

TABLE 26

| Formulation | Reactivity of the drying (% variation % $O_2$/% $N_2$/h/$m^2$ stain) |
|---|---|
| 16, comparative | 23 |
| 17, according to the invention | 38 |

The product 17 based on cerium sol accelerates the crosslinking of the alkyd polymer.

What is claimed is:

1. A composition, comprising a mixture of an aqueous paint and of an aqueous colloidal dispersion of a cerium compound, said dispersion exhibiting a pH of at least 7 and comprising an organic acid having at least three acid functional groups, the third pK of which is at most 10, or a salt of this acid, and aqueous ammonia or an amine.

2. The composition as claimed in claim 1, wherein the paint is a UV-crosslinkable stain.

3. The composition as claimed in claim 1, wherein the paint is based on an emulsion resin of an alkyd.

4. The composition as claimed in claim 1, wherein the pH of the colloidal dispersion is 7.5 to 9.5.

5. The composition as claimed in claim 1, having a ratio: moles of acid/moles of cerium, of 0.01 to 1.5.

6. The composition as claimed in claim 1, wherein the acid is citric acid.

7. The composition as claimed in claim 1, wherein the composition has a cerium content, expressed as cerium oxide, with respect to the whole of the composition.

8. The composition as claimed in claim 1, wherein the colloidal dispersion has particles whose size is of at most 100 nm.

9. A process for the preparation of a composition as claimed in claim 1, comprising the steps of: a) mixing an aqueous paint with an aqueous colloidal dispersion of a cerium compound, said dispersion exhibiting a pH of at least 7 and comprising an organic acid having at least three acid functional groups, the third pK of which is at most 10, or a salt of this acid, and aqueous ammonia or an amine.

10. The process as claimed in claim 9, wherein the dispersion used in step a) is obtained by addition, to an aqueous colloidal dispersion of a starting cerium compound, of the abovementioned acid and of the abovementioned base until a pH of at least 7 is obtained.

11. The composition as claimed in claim 7, wherein the cerium content, expressed as cerium oxide, is at most 10% by weight.

12. The composition as claimed in claim 8, wherein the size of the particles is at most 10 nm.

* * * * *